Figure 1:
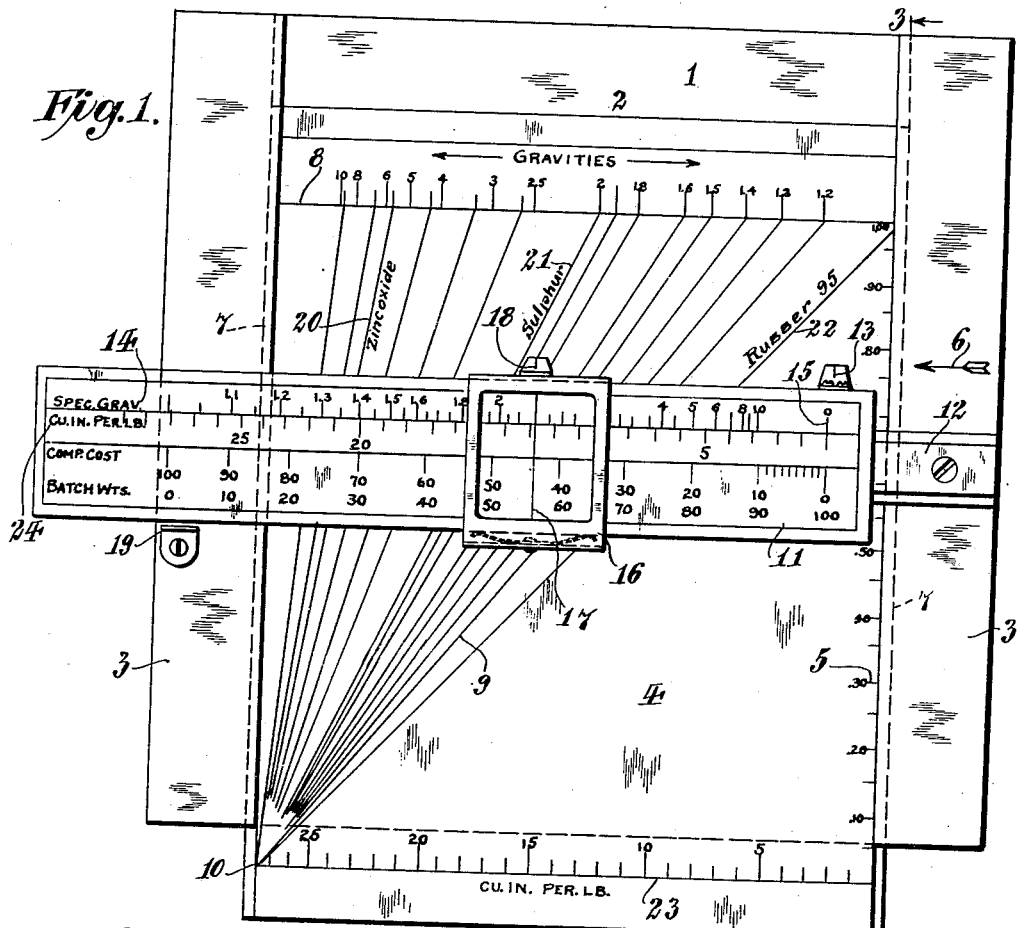

P. E. YOUNG.
CALCULATING DEVICE.
APPLICATION FILED MAR. 12, 1914.

1,200,569.

Patented Oct. 10, 1916.

WITNESSES

INVENTOR
Philip E. Young.
BY
ATTORNEYS

UNITED STATES PATENT OFFICE.

PHILIP E. YOUNG, OF FAIRHAVEN, MASSACHUSETTS.

CALCULATING DEVICE.

1,200,569.  Specification of Letters Patent.  Patented Oct. 10, 1916.

Application filed March 12, 1914. Serial No. 824,094.

*To all whom it may concern:*

Be it known that I, PHILIP E. YOUNG, a citizen of the United States, residing at Fairhaven, in the State of Massachusetts, have invented certain new and useful Improvements in Calculating Devices, of which the following is a specification.

My invention relates to a calculating device of the slide rule type and a general object of the invention is to provide a device for graphically determining the sum of several factors, each taken in different proportions to a definite numeral and specifically one object of the invention is to provide a means for quickly determining the specific density of a compound from the known percentage of its ingredients and their known specific densities.

Another object of the invention is to provide for a direct reading of the final resulting sum or, in the device illustrated, to obtain a direct reading of the resulting specific density of the compound.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

One illustrative means by which the above outlined objects may be attained is to provide a chart plotted with a plurality of right triangles superposed on each other and having a common side hereinafter, for convenience of reference, called the unit line, which line may be divided into percentages or other fractional parts to indicate the proportions of the ingredients in the compound. The apexes of the angles are coincident at the zero point of the percentage scale. The triangles are to each other as the trigometrical cotangents of the reciprocals of factors which indicate the known specific densities of the several ingredients composing the compound when the percentage scale is considered as unity. The line forming the sides opposite these angles, hereinafter called the base line, intersects the hundred per cent. mark on the unit line and the line is graduated from the unit line by the hypotenuses of the angles at distances which are to each other as the reciprocals of these factors.

The resulting specific density is obtained by adding the several base lines of triangles which are formed, one for each ingredient, similar to the plotted triangle on the chart. The base line of each of these constructed triangles intersects the unit line at that percentage mark which indicates the percentage of this ingredient in the compound. The addition of these several constructed base lines is made directly on a scale which is graduated as is the base line except that the graduations are in the opposite order that is toward the unit line.

Figure 2:
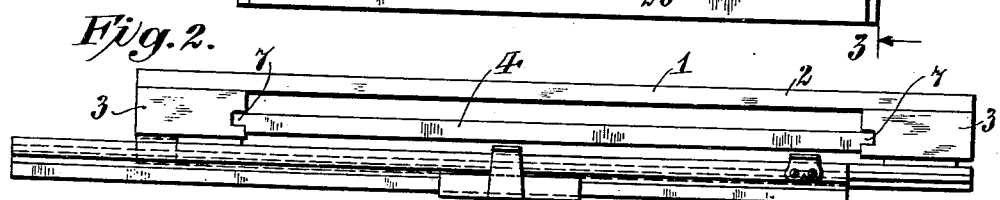
Figure 3:
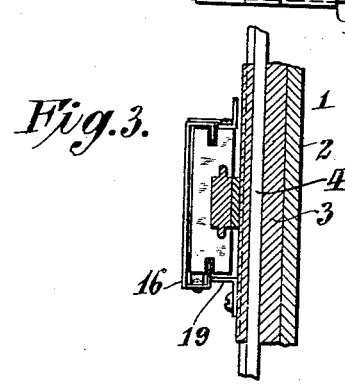

In the drawings: Figure 1 is a plan view of a device illustrating a preferred embodiment of my invention; Fig. 2 is an end view looking down upon the upper side of the device shown in Fig. 1, and Fig. 3 is a transverse sectional view taken at the portion of the line 3—3 of Fig. 1 which is adjacent the rule and looking in the direction indicated by the arrows.

There is shown a suitable support 1 comprising a bottom board 2 having oppositely disposed grooved guides 3 within which is slidably mounted a board 4 which board preferably may be entirely removed and reinserted with the opposite face uppermost. One or both faces of the board may contain charts suitably affixed thereto and arranged to contain different data for the several operations of which this device is capable.

The chart illustrated includes a scale 5 extending in the direction of movement of the board 4 which scale is graduated in percentage marks from 0 to 100 per cent. or in other suitable fractional factors. The scale slides relative to a fixed point of reference indicated by the arrow 6 on one of the guides or on some other suitable part of the fixed support.

A series of right triangles are plotted on the chart which triangles have a common side 7, designated as the unit line or coördinate, which is coincident with, or, as illustrated, is positioned opposite and corresponds in length and direction with the percentage scale 5. The other side of the triangles form a line 8, designated for convenience of reference as the base line, which is normal to the 100 per cent. of unity mark on the fraction scale and the hypotenuses 9 of the triangles intercept the base line at ⸴⸴s- tances from the unit line which are to each other as the reciprocals of those known factors which indicate the specific densities of the several ingredients of the compound.

The unit line 7 and all of the hypotenuses pass through a point 10 which is coincident with or directly opposite the zero point on the scale 5. The point 10 may be considered as the intersection of coördinates, one of which is the unit line 7 and the other of which is normal to the zero point on the scale 5.

A cross slide 11 is mounted on the fixed track 12 for movement transversely of the unit line and has a pointer 13 fixed thereto and movable on a line with the point of reference 6. This slide has a plurality of scales extending longitudinally thereof for use with the different charts on the different boards 4. In connection with the chart hereinbefore specifically described, reference will be made to the scale 14 which has a zero point opposite the pointer 13 and is graduated from this zero point toward the unit line in distances which are to each other as the reciprocals of progressing numbers and corresponds to the scale 8 except that it is reverse in direction.

A rider 16, such as is usually used on slide rules, is mounted on the cross slides 11 for sliding movement along the scale 14. This rider has a hair line 17 disposed across the scale 14 and has a pointer 15 which is in line with the hair line and is disposed as close to the hypotenuses of the triangles as possible so as to avoid parallax. The support has a fixed stop 19 so disposed that the hair lines coincide with the unit line when the rider is in contact with this stop.

For convenience in illustrating the operation of the device it will be considered that the diagonal or hypotenuse 20 indicates zinc oxid and passes through the graduation mark which is positioned $\frac{1}{5.8}$ unit distance from the line 7; that the diagonal 21 indicates sulfur and passes through the graduation mark positioned $\frac{1}{2}$ unit distance from the line 7, and the diagonal 22 indicates rubber and passes through the mark positioned $\frac{1}{.95}$ unit distance from the line 7.

In operating suppose the compound, the specific density of which is desired gave the following analysis:—

|  | Per cent. | Specific density. |
|---|---|---|
| Zinc oxid | 45 | 5.8 |
| Sulfur | 20 | 2.0 |
| Rubber | 35 | 0.95 |
|  | 100 |  |

To get the first, i. e. the zinc oxid reading, the board 4 is moved until the 45% mark on the scale 5 coincides with point 6; the cross slide 11 is moved until the pointer 13 coincides with the diagonal 20 and the rider 16 is moved until it engages the stop 19 which imposes the hair line 17 on the unit line 7. With the rider in this position on the scale 14, the board 4 is moved until the 20% mark is opposite the point 6 and the cross slide 11 together with the rider is moved until the pointer 18 coincides with the diagonal 21 and the rider is again moved into engagement with the stop 19.

With the rider in this second position the operation is repeated, with the point 6 at the 35% mark, the rider is finally moved into engagement with the stop and the resulting specific density of the compound may be read directly on the scale 14 under the hair line 17. Considered theoretically this specific density is obtained by adding the reciprocals of all the quotients obtained by dividing the fractional parts of the ingredients by the specific density of that ingredient. This may be expressed in the above illustrative example by the formula:

$$\text{Specific density:} \frac{100}{\frac{45}{5.8}+\frac{20}{2}+\frac{35}{.95}}$$

While the device has been described with reference to a chart for determining specific densities, it is obvious that the invention is of broader application and other forms of charts may be used. For instance the base line 8 may be graduated in terms of cubic inches per pound as indicated on the scale 23 and the rule 11 may have a scale 24 corresponding in direction and division to the scale 23. In case it is desired to determine the number of cubic inches per pound in the body, the specific density is obtained by any suitable means, such as above outlined, the cross slide is positioned centrally with the hair line at the specific density and the chart is moved upward until the rider index is at the scale 23 which will give the desired cubic inches per pound.

It is seen in general that the chart is formed of a plurality of right triangles, which triangles have a unitary side 7 and are to each other as the cotangents of the reciprocals of numbers which, in the chart illustrated, indicate the specific densities of the ingredients but which may of course indicate any qualitative factors. The rule 11 forms similar and smaller triangles within the charted triangles, the length of the base lines of which depends upon their distances from the zero point, that is, upon the relation of the fraction to unity. The length of these base lines are added directly on the cross slide scale and as the graduations on this scale correspond to the graduations on the base line, the readings will correspond in valuation to the valuations of the base line scale.

By means of my improvements the percentage of various ingredients can be found readily without intricate or lengthy calculation, consequently costs can quickly be computed.

It is obvious that the scale may be made as large as convenient, the larger the scale the greater the accuracy of resulting values of any computations of this character. Approximate values which can be obtained rapidly are usually most desirable and this can readily be attained by a small instrument of sufficient size to be conveniently carried about in the person's pocket.

The device may be conveniently arranged with a support such as is disclosed and numerous slides having upon opposite sides different charts for the different operations incidental to the different computing operations of any particular business.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim—

1. A calculating device comprising a support having a guiding means, a member mounted in said support for sliding movement in one direction relative thereto and having a chart thereon, said chart including value lines extending diagonally of its line of movement, a rule mounted for sliding movement transversely of the direction of movement of the chart, and transversely of the value lines, said rule having a scale thereon adapted to coöperate with the lines of said chart, and a rider mounted on said rule for sliding movement longitudinally of said scale.

2. A calculating device, comprising a support having a fixed point of reference, a member slidably mounted on said support for relative movement thereto in one direction, said member having a scale with equally spaced divisions extending in the direction of movement of said member and across said point of reference, a second scale extending at right angles to the direction of movement and intersecting said first named scale at right angles thereto, said second scale having divisions thereon spaced from a fixed point, distances which are to each other as the reciprocals of succeeding numbers, and diagonals passing through the divisions on said second scale and through a common point spaced from said scales, a second member slidable transversely of the movement of the first named member and in line with said fixed point of reference, said second member having a scale thereon with divisions spaced from a fixed point thereon distances which are to each other as the reciprocals of progressing numbers, the unit distance in said second mentioned scale and in the last mentioned scale being equal.

3. A calculating device, comprising a support, a member slidably mounted on said support for relative movement thereto in one direction, said member having a scale with divisions extending in the direction of movement of said member, a second scale extending at right angles to the direction of movement and intersecting said first named scale at right angles thereto, said second scale having divisions thereon spaced from a fixed point, distances which are to each other as the reciprocals of succeeding numbers, and diagonals passing through the divisions on said second scale and through a common point spaced from said scales, a second member slidable transversely of the movement of the first named member, said second member having a scale thereon with divisions spaced from a fixed point thereon distances which are to each other as the reciprocals of progressing numbers, the unit distance in said second mentioned scale and in the last mentioned scale being equal.

This specification signed and witnessed this 10" day of March, 1914.

PHILIP E. YOUNG.

Signed in the presence of—
ALLEN T. WEEKS,
FRANCIS R. PEABODY.